(12) United States Patent
Wang

(10) Patent No.: US 9,176,272 B2
(45) Date of Patent: Nov. 3, 2015

(54) BACKLIGHT KEYBOARD AND STRUCTURE THEREOF

(71) Applicants: DARFON ELECTRONICS (SUZHOU) CO., LTD., Suzhou, Jiangsu Province (CN); DARFON ELECTRONICS CORP., Taoyuan (TW)

(72) Inventor: Ching-Yu Wang, Taoyuan (TW)

(73) Assignees: DARFON ELECTRONICS (SUZHOU) CO., LTD., New District, Suzhou, Jiangsu Province (CN); DARFON ELECTRONICS CORP., Gueishan, Taoyuan (TW)

( * ) Notice: Subject to any disclaimer, the term of this patent is extended or adjusted under 35 U.S.C. 154(b) by 162 days.

(21) Appl. No.: 14/172,918

(22) Filed: Feb. 5, 2014

(65) Prior Publication Data

US 2014/0218890 A1  Aug. 7, 2014

(30) Foreign Application Priority Data

Feb. 6, 2013  (TW) .............................. 102202616 U

(51) Int. Cl.
| G01D 11/28 | (2006.01) |
| H01H 9/00 | (2006.01) |
| F21V 8/00 | (2006.01) |
| H01H 13/83 | (2006.01) |
| G06F 3/02 | (2006.01) |

(52) U.S. Cl.
CPC ............ *G02B 6/0055* (2013.01); *G06F 3/0202* (2013.01); *H01H 13/83* (2013.01); *H01H 2219/062* (2013.01)

(58) Field of Classification Search
CPC ............... G02B 6/0011; G02B 5/0055; H01H 2219/062; H01H 2219/014; H01H 2219/036; H01H 2219/037; H02H 2219/06

USPC .......... 362/23.03, 23.074, 23.07, 23.09, 602; 200/310, 317, 311–314, 5 A, 512, 293
See application file for complete search history.

(56) References Cited

U.S. PATENT DOCUMENTS

| 4,056,701 A * | 11/1977 | Weber .................... H01H 13/83 200/314 |
| 4,439,646 A * | 3/1984 | Bouvrande ........ H01H 13/7006 200/275 |
| 4,772,769 A * | 9/1988 | Shumate ............... G06F 3/0202 200/314 |
| 8,142,036 B2 * | 3/2012 | Chung ................. G02B 6/0031 200/314 |
| 2005/0122706 A1 * | 6/2005 | Sung ...................... H01H 13/83 362/23.03 |
| 2007/0062793 A1 * | 3/2007 | Hung .................... H01H 13/83 200/310 |
| 2009/0128496 A1 * | 5/2009 | Huang .................. G06F 3/0202 345/170 |
| 2011/0083951 A1 * | 4/2011 | Chung .................. H01H 13/83 200/512 |
| 2013/0069562 A1 * | 3/2013 | Bronstein .............. H01H 13/83 315/312 |
| 2014/0090966 A1 * | 4/2014 | Yu ........................ H01H 13/705 200/5 A |
| 2015/0083564 A1 * | 3/2015 | Verd Martinez ....... H01H 13/83 200/5 A |

* cited by examiner

*Primary Examiner* — Evan Dzierzynski
*Assistant Examiner* — Erin Kryukova
(74) *Attorney, Agent, or Firm* — Winston Hsu; Scott Margo

(57) ABSTRACT

A backlight keyboard structure includes a light guide plate, a base plate and a keyboard frame. The keyboard frame comprising a fixing portion. The base plate is adjacent to one side of the light guide plate and disposed between the keyboard frame and the light guide plate. The base plate has a through hole corresponding to the fixing portion. The base plate has an indentation portion surrounding the through hole and disposed between the light guide plate and the through hole for shielding.

13 Claims, 3 Drawing Sheets

BACKLIGHT KEYBOARD AND STRUCTURE THEREOF

BACKGROUND OF THE INVENTION

1. Field of the Invention

The present invention relates to a keyboard, and more specifically, to a backlight keyboard and structure thereof capable of avoiding light leakage from gaps around key caps and a through hole of a base plate.

2. Description of the Prior Art

An input device is in widespread use along with the development and researches of electronic devices. Nowadays, there are common input devices such as a keyboard, a touch panel or a mouse. For taking the keyboard as an example, the keyboard includes a plurality of keyswitches. A conventional keyswitch includes a key cap, a scissor structure and a base plate. Each of the key caps is corresponding to a character or a symbol, so that a user can press the key cap for inputting a signal of the corresponding character or symbol to an electronic device.

In addition, the scissor structure is disposed between the key cap and the base plate for supporting the keycap and driving the key cap to perpendicularly move up and down relative to the base plate. However, light may leak from gaps around the key caps and a through hole of a backlight keyboard. Hence, there is a need to improve the issue of the light leakage of the backlight keyboard.

SUMMARY OF THE INVENTION

The present invention is to provide a backlight keyboard and structure thereof capable of avoiding light leakage from gaps of key caps and a through hole of a base plate, to solve the above-mentioned issue.

According to the disclosure, a backlight keyboard structure includes a light guide plate, a keyboard frame and a base plate. The light guide plate includes an opening portion, and the light guide plate guiding a light. The keyboard frame includes a fixing portion. The base plate is adjacent to one side of the light guide plate and is disposed between the keyboard frame and the light guide plate. The base plate has a through hole and an indentation portion surrounding the through hole, wherein the opening portion, the through hole and the fixing portion are disposed correspondingly, the indentation portion extends toward the opening portion of the light guide plate, so that the indentation portion shields the light emitted from the light guide plate and reduces the light entering the through hole.

According to the disclosure, the base plate includes a first surface and a second surface opposite to each other, the through hole penetrates the base plate, and a surrounding of the through hole is depressed from the first surface toward the second surface to form the indentation portion.

According to the disclosure, the indentation portion is stamped to form a recess portion surrounding the through hole.

According to the disclosure, the opening portion includes an inner surface, and the indentation portion extends into the opening portion so as to shield at least a part of the inner surface of the opening portion.

According to the disclosure, a depth of the indentation portion is larger than or equal to a thickness of the light guide plate, so that the indentation portion completely shields the inner surface of the opening portion.

According to the disclosure, a backlight keyboard includes a keyboard casing, a back light keyboard and a light source. The backlight keyboard structure includes a light guide plate, a keyboard frame and a base plate. The light guide plate includes an opening portion, and the light guide plate guiding a light. The keyboard frame includes a fixing portion. The base plate is adjacent to one side of the light guide plate and is disposed between the keyboard frame and the light guide plate. The base plate has a through hole and an indentation portion surrounding the through hole, wherein the opening portion, the through hole and the fixing portion are disposed correspondingly, the indentation portion extends toward the opening portion of the light guide plate, so that the indentation portion shields the light emitted from the light guide plate and reduces the light entering the through hole. The fixing portion passes through the through hole to connect to the keyboard casing. The light source is adjacent to another side of the light guide plate, the light source emits the light into the light guide plate.

According to the disclosure, the light source includes a circuit board and a light emitting component electrically connected to the circuit board, and the light emitting component is disposed within the light guide plate or is coplanar with the light guide plate.

According to the disclosure, the backlight keyboard further includes a film circuit board disposed between the keyboard frame and the base plate, the film circuit board includes a plurality of switches. Each of the plurality of switches is selectively actuated respectively.

According to the disclosure, the backlight keyboard further includes a plurality of key caps disposed on an upper side of the film circuit board and located in a position corresponding to the plurality of switches.

The backlight keyboard of the present invention includes the indentation portion surrounding the through hole of the base plate. The indentation portion shields between the through hole and the indentation portion so that the light transmitted from the light guide plate is reflected and cannot travel into the through hole. The light leakage of the backlight keyboard is reduced. Therefore, the conventional issue that the light leaks form the gaps of the key caps and the through hole is solved.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
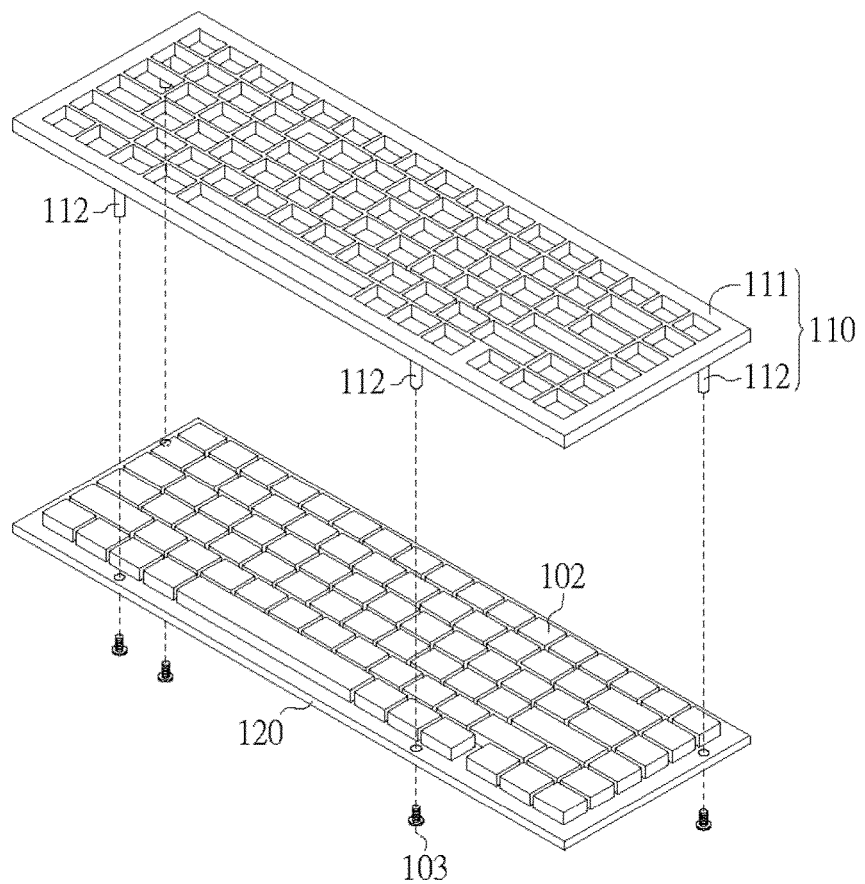
FIG. 1 is a schematic diagram of a backlight keyboard according to an embodiment of the present invention.
Figure 2A:
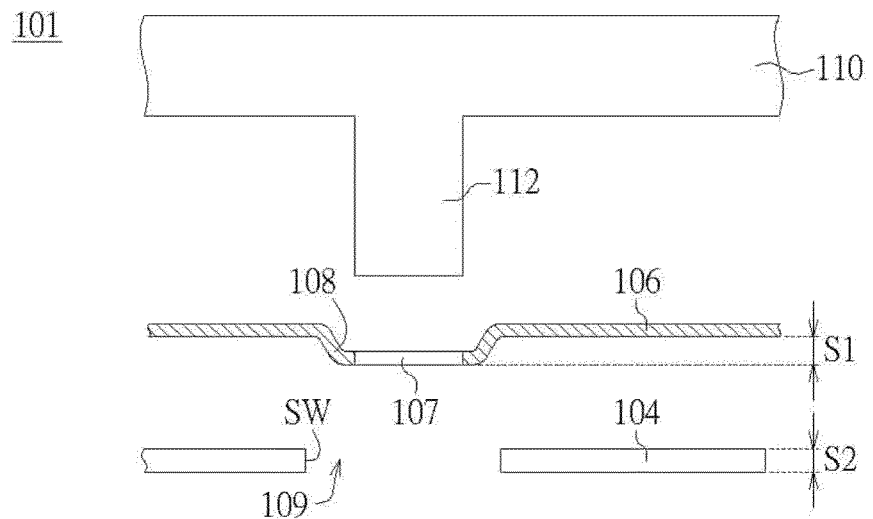
FIG. 2A is a partial cross-sectional diagram of a backlight keyboard structure of the backlight keyboard before assembly according to the embodiment of the present invention.

Please refer to FIG. 1 and FIG. 2A. FIG. 1 is a schematic diagram of a backlight keyboard 100 according to an embodiment of the present invention. FIG. 2A is a partial cross-sectional diagram of a backlight keyboard structure 101 of the backlight keyboard 100 before assembly according to the embodiment of the present invention. The backlight keyboard 100 includes a keyboard casing 120 and the backlight keyboard structure 101. The backlight keyboard structure 101 is disposed on the keyboard casing 120 and includes a light guide plate 104, a base plate 106 and a keyboard frame 110. The light guide plate 104 includes an opening portion 109, and the opening portion 109 includes an inner surface SW. The keyboard frame 110 includes a fixing portion 112. The base plate 106 is adjacent to one side of the light guide plate 104 and disposed between the keyboard frame 110 and the light guide plate 104. The base plate 106 has a through hole 107 and an indentation portion 108 surrounding the through hole 107. The opening portion 109, the through hole 107 and the fixing portion 112 are disposed correspondingly.

In addition, the backlight keyboard 110 further includes key caps 102. The keyboard frame 110 is covered on the base plate 120 for preventing dust or external objects from dropping into gaps of the key caps 102 and affecting the operation of the key caps 102. As shown in FIG. 1 and FIG. 2, each of the key caps 102 is fixed on the base plate 106 by a supporting structure disposed under the corresponding key cap 102, such as a scissor structure. The keyboard frame 110 includes a body 111 and a plurality of fixing portions 112. The body 111 and the plurality of fixing portion 112 can be formed integrally in an injection molding manner. The fixing portion 112 can be a fixing boss for engaging with a fixing component, such as a screw 103. Thus, the screw 103 can pass through the base plate 120 and be fixed on the fixing portion 112. In this embodiment, the keyboard frame 110 includes four or more than four fixing portions 112 surrounding the keyboard frame 110, but not limited to this. The fixing portions 112 can be disposed in a central section of the keyboard frame 110 or in other positions, and the number of the fixing portion 112 can be determined according to actual requirements.

Figure 2B:
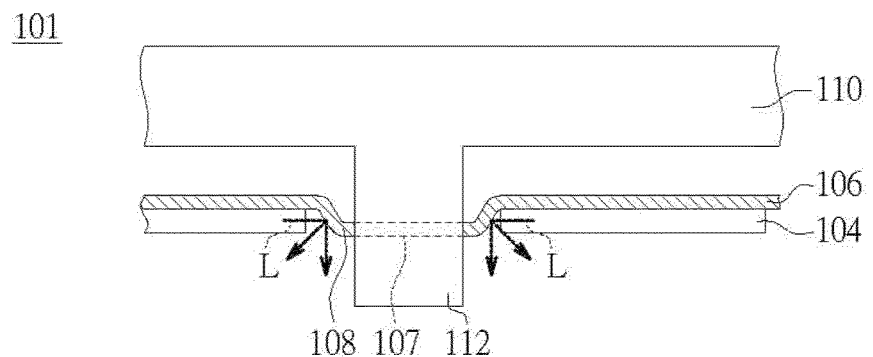
FIG. 2B is a partial cross-sectional diagram of the backlight keyboard structure after assembly according to the embodiment of the present invention.

Please refer to FIG. 2B. FIG. 2B is a partial cross-sectional diagram of the backlight keyboard structure 101 after assembly according to the embodiment of the present invention. The light guide plate 104 is for guiding a light L. To solve a problem that the light L transmitted from the light guide plate 104 is reflected and passes through the through hole 107 to cause a light leakage, the indentation portion 108 is surrounding the through hole 107 and extends toward the opening portion 109 of the light guide plate 104, so that the indentation portion 108 shields the light L emitted from the light guide plate 104 and reduces the light L entering the through hole 107. The indentation portion 108 is depressed downward and disposed on a travelling path of the light L. The indentation portion 108 reflects the light L transmitted from the light guide plate 104 so that a traveling direction of the light L changes or the light L scatters to travel faraway from the through hole 107. Thus, the light L cannot travel into the through hole 107 and weakens by absorption, so as to prevent the light leakage of the backlight keyboard 100.

Figure 3A:
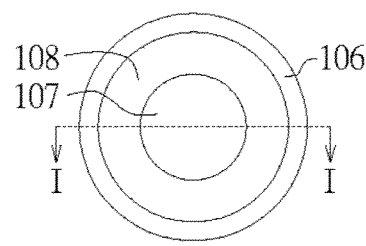
FIG. 3A is a partial top view of the backlight keyboard structure according to the embodiment of the present invention.
Figure 3B:
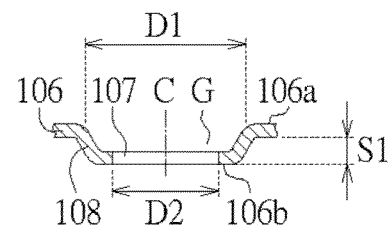
FIG. 3B is a cross-sectional diagram along line I-I in FIG. 3A of the backlight keyboard structure according to the embodiment of the present invention.

Please refer to FIG. 3A and FIG. 3B, FIG. 3A is a partial top view of the backlight keyboard structure 101 according to the embodiment of the present invention. FIG. 3B is a cross-sectional diagram along line I-I in FIG. 3A of the backlight keyboard structure 101 according to the embodiment of the present invention. The base plate 106 includes a first surface 106a and a second surface 106b opposite to each other. The through hole 107 penetrates the base plate 106, and the surrounding of the through hole 107 is depressed from the first surface toward the second surface to form the indentation portion 108. In this embodiment, the indentation portion 108 is stamped to form a basin-shaped recess portion G surrounding the through hole 107. A central section of the recess portion G is substantially aligned with a central axis C of the through hole 107. An opening D1 of the recess portion G is larger than an opening D2 of the through hole 107 so as to form a light shielding structure with a wide top and a narrow bottom.

In the embodiment, a depth of the indentation portion 108 is preferably larger than or equal to a thickness S2 of the light guide plate 104. As shown in FIG. 2A and FIG. 2B, the indentation portion 108 and the light guide plate 104 are coplanar, the indentation portion 108 extends into the opening portion 109 of the light guide plate 104 so as to shield at least a part of the inner surface SW of the opening portion 109. More specifically, as the depth S1 of the indentation portion 108 is larger than or equal to the thickness S2 of the light guide plate 104, the indentation portion 108 completely shields the inner surface SW of the opening portion 109. That is, the light L transmitted from the light guide plate 104 is completely shielded by the indentation portion 108 so as not to travel into the through hole 107, so that the light leakage of the backlight keyboard 100 is reduced.

Figure 4:
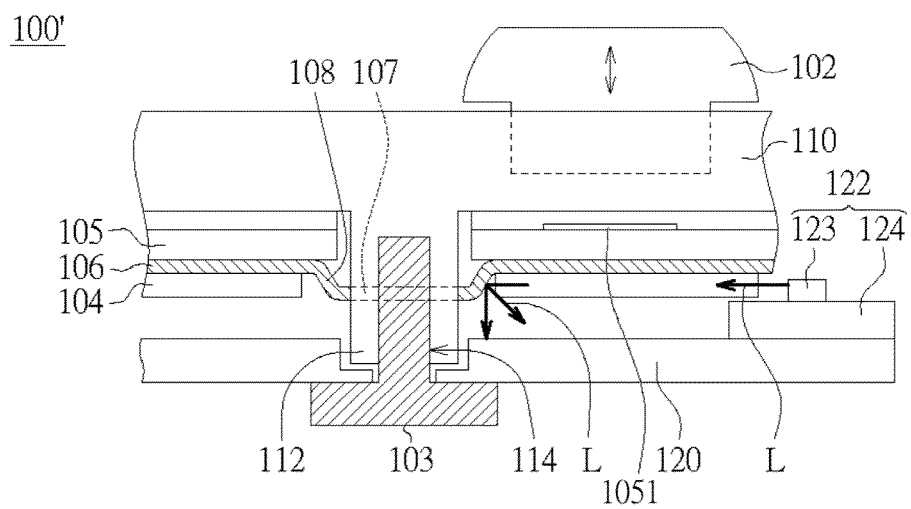
FIG. 4 is a cross-sectional diagram of the backlight keyboard according to another embodiment of the present invention.

Please refer to FIG. 4. FIG. 4 is a cross-sectional diagram of the backlight keyboard 100' according to another embodiment of the present invention. The backlight keyboard 100' in this embodiment includes a film circuit board 105. The film circuit board 105 is disposed between the keyboard frame 110 and the base plate 106. The film circuit board 105 includes a plurality of switches 1051, and each of the plurality of switches 1051 is selectively actuated. The plurality of key caps 102 is disposed on an upper side of the film circuit board 105 and located in a position corresponding to the plurality of switches 1051. The key caps 102 is disposed in the keyboard frame 110 to move up and down in response of pressing, so as to contact the film circuit board under the key caps 102 and output the corresponding signal of a character or a symbol.

In addition, the backlight keyboard 100' further includes a light source 122 adjacent to another side of the light guide plate 104 and between the keyboard casing 120 and the light guide plate 104. The light source 122 includes a light emitting component 123 and a circuit board 124. The light emitting component 123 is electrically connected to the circuit board 124, and the light source 122 emits light into the light guide plate 104. The light emitting component 123 is disposed within the light guide plate 104 or is coplanar with the light guide plate 104. Thus, the light L transmitted from the light emitting component 123 travels under the key caps 102 as a light source for each of the plurality of key caps 102 so as to show the character or the symbol of the key cap 102. In addition, the fixing portion 112 has a thread 114 corresponding to the screw 103 for fixing the screw 103, so as to fix the keyboard frame 110 on the base plate 120.

As shown in FIG. 4, the indentation portion 108 shields the light L emitted from the light guide plate 104 and reduces the light L entering the through hole 107 in this embodiment. Even though the through hole 107 is opened on the base plate 106, so that the screw 103 can pass through the through hole 107 to be fixed on the keyboard frame 110, the light L transmitted from the light guide plate 104 is totally reflected by the indentation portion 108. The light L cannot travel into the through hole 107 and cannot be reflected by the through hole 107, so that the light leakage of the backlight keyboard 100' is reduced.

In contrast to the prior art, the backlight keyboard of the present invention includes the indentation portion surrounding the through hole of the base plate. The indentation portion shields between the through hole and the indentation portion so that the light transmitted from the light guide plate is reflected and cannot travel into the through hole. The light leakage of the backlight keyboard is reduced. Therefore, the conventional issue that the light leaks from the gaps around the key caps and the through hole is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight keyboard structure comprising:
   a light guide plate comprising an opening portion, and the light guide plate guiding a light;
   a keyboard frame comprising a fixing portion; and
   a base plate adjacent to the light guide plate and disposed between the keyboard frame and the light guide plate, the base plate having a through hole and an indentation portion surrounding the through hole;
   wherein the opening portion, the through hole and the fixing portion are disposed correspondingly, the indentation portion extends toward the opening portion of the light guide plate, so that the indentation portion shields the light emitted from the light guide plate and reduces the light entering the through hole.

2. The backlight keyboard structure of claim 1, wherein the base plate comprises a first surface and a second surface opposite to each other, the through hole penetrates the base plate, and a surrounding of the through hole is depressed from the first surface toward the second surface to form the indentation portion.

3. The backlight keyboard structure of claim 1, wherein the indentation portion is stamped to form a recess portion surrounding the through hole.

4. The backlight keyboard structure of claim 1, wherein the opening portion comprises an inner surface, and the indentation portion extends into the opening portion so as to shield at least a part of the inner surface of the opening portion.

5. The backlight keyboard structure of claim 4, wherein a depth of the indentation portion is larger than or equal to a thickness of the light guide plate, so that the indentation portion completely shields the inner surface of the opening portion.

6. A backlight keyboard comprising:
   a keyboard casing;
   a backlight keyboard structure comprising:
      a light guide plate comprising an opening portion, and the light guide plate guiding a light;
      a keyboard frame comprising a fixing portion; and
      a base plate adjacent to one side of the light guide plate and disposed between the keyboard frame and the light guide plate, the base plate having a through hole and an indentation portion surrounding the through hole;
      wherein the opening portion, the through hole and the fixing portion are disposed correspondingly, the indentation portion extends toward the opening portion of the light guide plate, so that the indentation portion shields the light emitted from the light guide plate and reduces the light entering the through hole, and the fixing portion passes through the through hole to connect to the keyboard casing; and
   a light source adjacent to the light guide plate, the light source emitting the light into the light guide plate.

7. The backlight keyboard of claim 6, wherein the light source comprises a circuit board and a light emitting component electrically connected to the circuit board, and the light emitting component is disposed within the light guide plate or is coplanar with the light guide plate.

8. The backlight keyboard of claim 7, further comprising a film circuit board disposed between the keyboard frame and the base plate, the film circuit board comprising a plurality of switches, and each of the plurality of switches being selectively actuated respectively.

9. The backlight keyboard of claim 8, further comprising a plurality of key caps disposed on an upper side of the film circuit board and located in a position corresponding to the plurality of switches.

10. The backlight keyboard of claim 6, wherein the indentation portion is stamped to form a recess portion surrounding the through hole.

11. The backlight keyboard of claim 6, wherein the opening portion comprises an inner surface, and the indentation portion extends into the opening portion so as to shield at least a part of the inner surface of the opening portion.

12. The backlight keyboard of claim 11, wherein a depth of the indentation portion is larger than or equal to a thickness of the light guide plate, so that the indentation portion completely shields the inner surface of the opening portion.

13. The backlight keyboard of claim 6, wherein the base plate comprises a first surface and a second surface opposite to each other, the through hole penetrates the base plate, and a surrounding of the through hole is depressed from the first surface to the second surface to form the indentation portion.

* * * * *